United States Patent
van Blokland

(10) Patent No.: US 10,206,406 B2
(45) Date of Patent: Feb. 19, 2019

(54) DEVICE FOR CUTTING DOUGH

(71) Applicant: Radie B.V., Culemborg (NL)

(72) Inventor: Johannes Josephus Antonius van Blokland, Beusichem (NL)

(73) Assignee: Radie B.V., Culemborg (NL)

( * ) Notice: Subject to any disclaimer, the term of this patent is extended or adjusted under 35 U.S.C. 154(b) by 138 days.

(21) Appl. No.: 15/142,012

(22) Filed: Apr. 29, 2016

(65) Prior Publication Data
US 2016/0316770 A1    Nov. 3, 2016

(30) Foreign Application Priority Data

Apr. 30, 2015    (EP) .................................... 15166067

(51) Int. Cl.
*A21C 14/00*    (2006.01)
*A21C 11/10*    (2006.01)
*B26D 1/60*    (2006.01)
*B26D 5/08*    (2006.01)

(52) U.S. Cl.
CPC .............. *A21C 14/00* (2013.01); *A21C 11/10* (2013.01); *B26D 1/60* (2013.01); *B26D 5/08* (2013.01); *B26D 2210/02* (2013.01)

(58) Field of Classification Search
CPC ....... A21C 14/00; B26D 5/08; B26D 2210/02
See application file for complete search history.

(56) References Cited

U.S. PATENT DOCUMENTS

| | | | | |
|---|---|---|---|---|
| 2,802,431 A | * | 8/1957 | Hoagland | A21C 11/10 83/311 |
| 3,581,616 A | * | 6/1971 | Kawae | B23D 25/04 83/311 |
| 3,680,616 A | * | 8/1972 | Rejsa | B26D 1/60 83/105 |
| 3,958,481 A | * | 5/1976 | Arai | B26D 1/585 83/311 |
| 4,266,456 A | * | 5/1981 | Oostvogels | B26D 7/0616 74/37 |
| 4,516,459 A | * | 5/1985 | Kappl | B26D 7/0616 83/412 |
| 4,748,882 A | * | 6/1988 | Anderson | B26D 1/60 83/110 |

(Continued)

FOREIGN PATENT DOCUMENTS

| | | |
|---|---|---|
| DE | 19549762 B4 | 7/2007 |
| EP | 2628392 A1 | 8/2013 |
| EP | 2633760 A1 | 9/2013 |

*Primary Examiner* — Sean Michalski
(74) *Attorney, Agent, or Firm* — The Webb Law Firm

(57) ABSTRACT

Device for cutting dough, comprising a conveyor belt, for conveying the dough in an essentially horizontal direction of conveyance, a sledge, arranged above the conveyor belt, and movable in the direction of said conveyor belt, a cutting blade, suspended on the sledge, and movable with respect to the sledge in an essentially vertical direction toward and from the conveyor belt, for cutting the dough on the belt, a first drive, for moving the sledge in the direction of the conveyor, a second drive, for moving the cutting blade in a vertical direction toward and from the conveyor belt, wherein the second drive is arranged outside the sledge, in a fixed position, and provided with a transmission for conveying movement from the second drive to the cutting blade. The invention further relates to a method for operating such device.

13 Claims, 1 Drawing Sheet

(56) References Cited

U.S. PATENT DOCUMENTS

Figure 1:
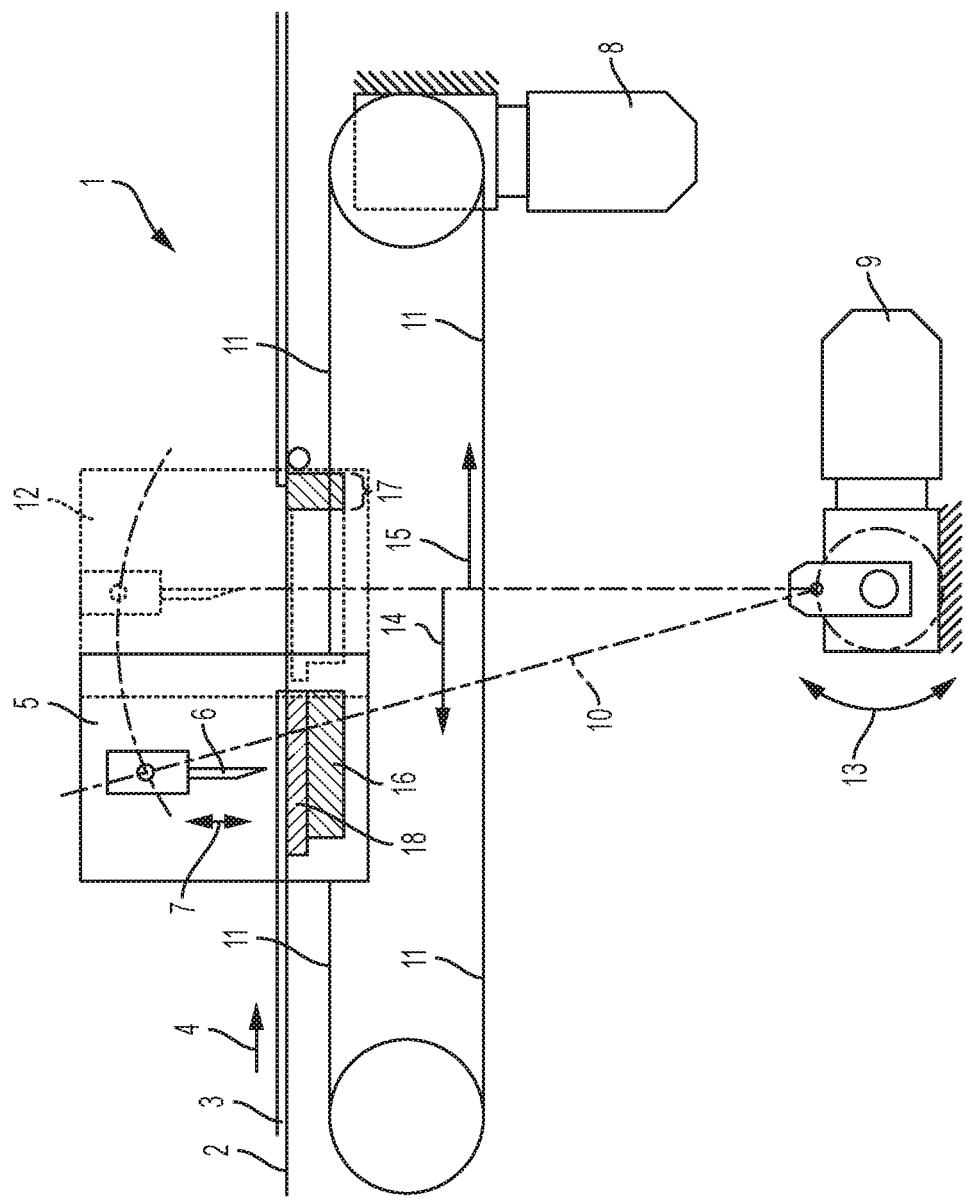

| | | | | |
|---|---|---|---|---|
| 6,032,561 | A * | 3/2000 | Lonn | A21C 15/04 83/318 |
| 6,533,891 | B1 * | 3/2003 | Kubinski | B29C 65/5042 156/304.1 |
| 8,608,467 | B2 * | 12/2013 | Van Blokland | A21C 3/08 425/3 |
| 8,997,614 | B2 * | 4/2015 | Baechtle | B26D 1/56 83/112 |
| 9,307,773 | B2 * | 4/2016 | van Blokland | A21C 5/00 |
| 9,414,604 | B2 * | 8/2016 | van Blokland | A21C 9/085 |
| 9,474,302 | B2 * | 10/2016 | White | A24B 7/12 |
| 9,521,852 | B2 * | 12/2016 | van Blokland | G01G 11/04 |
| 2013/0000454 | A1 * | 1/2013 | Miller | A22C 17/0006 83/37 |
| 2013/0205961 | A1 | 8/2013 | Baechtle et al. | |
| 2013/0283988 | A1 | 10/2013 | van Blokland | |

* cited by examiner

DEVICE FOR CUTTING DOUGH

CROSS-REFERENCE TO RELATED APPLICATION

This application claims priority to European Patent Application No. 15166067.7 filed Apr. 30, 2015, the disclosure of which is hereby incorporated in its entirety by reference.

The present invention relates to a device for cutting dough. In particular, the invention relates to a device for cutting dough, continuously conveyed by a conveyor. Such dough will be referred to as an endless dough piece or sheet in the following.

So called sheeting is a commonly applied method in dough production. Dough is lead along several processing stages in a continuous manner, before being separated into individual products. Often these products are to have the same sizes, weights or both.

Since the weight distribution of a dough sheet may be less than perfect, a requirement of pieces with the same weight implies—in case of a continuous conveyor speed—different lengths. When high speed cutting is required, this may be done, by changing both the cutting frequency as the cutting location. Devices for that purpose and working according to this principle are known in the art.

However, changing the cutting location requires the (often fast) movement of heavy device components such as a cutting blade and its drive, which requires relatively high power, very accurate control and sets high requirements to the mechanical construction of the device.

It is therefore a goal of the present invention to provide a device for cutting dough that lacks the above disadvantages, or at least provides a useful alternative to the state of the art.

The invention thereto proposes a device for cutting dough, comprising a conveyor belt, for conveying the dough in an essentially horizontal direction of conveyance, a sledge, arranged above the conveyor belt, and movable in (or against) the direction of said conveyor belt, a cutting blade, suspended on the sledge, and movable with respect to the sledge in an essentially vertical direction toward and from the conveyor belt, for cutting the dough on the belt, a first drive, for moving the sledge in the direction of the conveyor; a second drive, for moving the cutting blade in a vertical direction toward and from the conveyor belt, wherein the second drive is arranged outside the sledge, in a fixed position, and provided with a transmission for conveying movement from the second drive to the cutting blade.

A sledge is to be understood here as a device that makes a sliding movement. This may also include a device suspended on wheels or other bearings. The sledge serves to move the cutting blade in or against the direction of the conveyed dough. By arranging the second drive, for moving the cutting blade in a vertical direction toward and from the conveyor belt, that is, for the cutting operation itself, outside the sledge, less weight has to be accelerated and decelerated when moving the cutting blade is required, which enables to construct a faster, more accurate and less power consuming device. The first drive may comprise an endless belt or chain for moving the sledge in an essentially horizontal plane in or against the direction of the conveyed dough and is preferably also arranged outside the sledge. The cutting blade may be exchangeable to allow installation of the most suitable blade for a certain operation. In particular, for the ease of maintenance, the blade is removable in a direction essentially sideward, that is, essentially horizontal in a direction perpendicular to the direction of conveyance of the dough.

The second drive may for instance be a rotational drive, while the transmission may be a connecting rod, for transforming the rotational movement into a translational movement. When the cutting blade is in a default position, which is the closest position to the second drive, the rod may have a length that permits the second drive to freely rotate, wherein the cutting blade just touches the conveyor belt when it is in its lowest position.

In order to avoid damage to the belt due to tolerances in production or adjustment, or due to drifting during use, a stroking block with a softened (for instance PUR) top layer may be provided, which may advantageously be configured for moving with the speed of the conveyor when the cutting blade is operated, so that friction between conveyor, blade and stroking block is minimised. When the sledge is moved out of its default position, it gets further away from the second drive, and the rod "becomes too short" to allow a free rotation of the second drive.

For this reason, the second drive comprises a controller, configured for controlling the rotation of the second drive, wherein the controller is configured for limiting the freedom of rotation of the second drive as a function of the position of the sledge. The further the sledge is removed from its default position, the more limited the rotation of the second drive. In other words, the sledge has a default position, wherein the second drive has a maximum freedom of rotation, and wherein the freedom of rotation is limited in dependency of the distance the sledge is moved from said default position.

The first drive may comprise for instance an endless belt, which may be a toothed belt, or any other known positioning system according to the art.

The device according to the invention may as a first example mode be operated according to a method, comprising positioning the sledge in a default position when an endless dough piece conveyed on the first conveyor with a continuous speed is to be cut in pieces of equal length; in order to adjust this length if desired, the cutting frequency is adjusted. In an advanced embodiment hereof, when adjusting the cutting frequency, the time that the knife is engaging the dough is herein kept constant. By increasing or decreasing the time that is taken to move the knife back to its initial position, the frequency can be set. An even more advanced control setting minimizes the change in acceleration, or jerk, in order to avoid unnecessary oscillations.

In a second example mode, the first drive and the second drive cooperate in such way that the cutting blade has a speed in a direction of conveyance that equals the speed of the dough, at least at the moment where the cutting blade interacts with (i.e. cuts) the dough, and wherein the cutting blade is moved against the direction of conveyance of the dough between two cutting operations.

Optionally, in a third example mode, the cutting blade remains in between two separated dough pieces afterwards for a while, in order to increase the certainty and quality of the cut.

In a fourth example mode, the cutting blade is set to have an increased speed after cutting the dough, while it is still in between two dough pieces that it just separated, in order to shift the pieces somewhat from each other.

The latter three modi may comprise limiting the freedom of rotation of the second drive when the sledge is removed from its default position.

The first and the second drive may be operated independently.

Multiple control configurations are thinkable, since controlling the first and second drive enables any horizontal and vertical speed of the cutting blade with respect to the conveyor and the dough.

The invention will now be elucidated into more detail with reference to FIG. 1. FIG. 1 shows a device 1 for cutting dough according to the present invention, comprising a conveyor belt 2, for conveying the dough 3 in an essentially horizontal direction of conveyance 4, a sledge 5, arranged above the conveyor belt 2, and movable in (or against) the direction 4 of said conveyor belt 2, a cutting blade 6, suspended on the sledge 5, and movable with respect to the sledge 5 in an essentially vertical direction 7 toward and from the conveyor belt 2, for cutting the dough 3 on the belt 2, a first drive 8, for moving the sledge in the direction 4 of the conveyor, a second drive 9, for moving the cutting blade 6 in a vertical direction 7 toward and from the conveyor belt 2, arranged outside the sledge 5, in a fixed position, and provided with a transmission 10 for conveying movement from the second drive to the cutting blade. The second drive 9 is a rotational drive, and the transmission 10 is a connecting rod, for transforming the rotational movement into a translational movement. The first drive 8 comprises an endless belt 11.

The sledge 5 has a default position 12, wherein the second drive 9 has a maximum 30 freedom of rotation 13, and the freedom of rotation is limited in dependency of the distance 14, 15 the sledge is moved from said default position. The second drive 9 has a free rotation when the sledge 5 is in its default position 12. A first stroking block 16 with a softened (for instance rubber) top layer 18 is present, which is configured for moving with the speed of the conveyor when the cutting blade is operated, so that friction between conveyor, blade and stroking block is minimised. Furthermore, a second stroking block 17 is present, in a fixed position. In this particular case, the position of the rigid stroking block is optionally chosen at a transition of two conveyors, and it serves for applying the control mode described in the fourth example above.

The invention claimed is:

1. A device for cutting dough, comprising:
    a conveyor belt, for conveying the dough in an essentially horizontal direction of conveyance;
    a sledge, arranged above the conveyor belt, and movable in the direction of said conveyor belt;
    a cutting blade, suspended on the sledge, and movable with respect to the sledge in an essentially vertical direction toward and from the conveyor belt, for cutting the dough on the belt,
    a first drive, for moving the sledge in the direction of the conveyor;
    a second drive, for moving the cutting blade in a vertical direction toward and from the conveyor belt;
    wherein the second drive is arranged outside the sledge, in a fixed position, and provided with a transmission for conveying movement from the second drive to the cutting blade, and
    wherein the second drive is a rotational drive, and the transmission is a connecting rod, for transforming the rotational movement into a translational movement,
    wherein the second drive comprises a controller, configured for controlling the rotation of the second drive, and further
    wherein the controller is configured for limiting the rotation of the second drive as a function of the position of the sledge.

2. The device according to claim 1, wherein the first drive comprises an endless belt.

3. The device according to claim 1, wherein the sledge has a default position, wherein the second drive has a maximum degree of rotation, and wherein the degree of rotation is limited in dependency of the distance the sledge is moved from said default position.

4. The device according to claim 3, wherein the rotation of the second drive is not limited when the sledge is in its default position.

5. The device according to claim 1, comprising a stroking block configured for moving with the speed of the conveyor when the cutting blade is operated, so that friction between conveyor, blade and stroking block is minimised.

6. The device according to claim 5, wherein the stroking block comprises a softened top layer.

7. The device according to claim 6, wherein the stroking block comprises a soft polyurethane or rubber top layer.

8. A method for operating a device according to any of the preceding claims, comprising:
    positioning the sledge in a default position, wherein the sledge is closest to the second drive, when an endless dough piece conveyed on the first conveyor with a continuous speed is to be cut in pieces of equal length; and
    in order to adjust the length, adjusting the cutting frequency.

9. The method according to claim 8, comprising keeping the time that the knife is engaging the dough constant when adjusting the cutting frequency.

10. The method according to claim 9, comprising setting the cutting frequency by increasing or decreasing only the time that is taken to move the knife back to its initial position.

11. The method according to claim 8, comprising controlling the first drive and the second drive to cooperate in such way that the cutting blade has a speed in a direction of conveyance that equals the speed of the dough, at least at the moment where the cutting blade interacts with the dough, and wherein the cutting blade is moved against the direction of conveyance of the dough between two cutting operations.

12. The method according to claim 11, wherein the cutting blade remains in between two separated dough pieces during interaction with the dough for a period sufficient to prevent any deficiencies in the quality of the cut.

13. The method according to claim 8, wherein the cutting blade is set to have an increased speed after cutting the dough, while it is still in between two dough pieces that it just separated, in order to shift the pieces somewhat from each other.

* * * * *